United States Patent
Sugahara

(10) Patent No.: US 12,508,840 B2
(45) Date of Patent: Dec. 30, 2025

(54) TIRE

(71) Applicant: SUMITOMO RUBBER INDUSTRIES, LTD., Kobe (JP)

(72) Inventor: Kazuchika Sugahara, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 8 days.

(21) Appl. No.: 18/211,619

(22) Filed: Jun. 20, 2023

(65) Prior Publication Data

US 2023/0415513 A1 Dec. 28, 2023

(30) Foreign Application Priority Data

Jun. 24, 2022 (JP) ................ 2022-101547

(51) Int. Cl.
| | | |
|---|---|---|
| *B60C 1/00* | (2006.01) | |
| *B60C 11/00* | (2006.01) | |
| *B60C 11/03* | (2006.01) | |
| *C08K 3/04* | (2006.01) | |
| *C08K 3/36* | (2006.01) | |
| *C08L 9/06* | (2006.01) | |

(52) U.S. Cl.
CPC ........ *B60C 1/0016* (2013.01); *B60C 11/0008* (2013.01); *B60C 11/005* (2013.01); *B60C 11/03* (2013.01); *C08K 3/04* (2013.01); *C08K 3/36* (2013.01); *C08L 9/06* (2013.01); *B60C 2011/0025* (2013.01); *B60C 2011/0339* (2013.01); *C08K 2201/006* (2013.01)

(58) Field of Classification Search
CPC ......... B60C 11/0008; B60C 2011/0025; B60C 2011/0033
See application file for complete search history.

(56) References Cited

U.S. PATENT DOCUMENTS

| | | | |
|---|---|---|---|
| 2019/0185639 A1 | 6/2019 | Kasai et al. | |
| 2020/0369087 A1* | 11/2020 | Matsui | B60C 11/0008 |
| 2022/0235209 A1* | 7/2022 | Washizu | B60C 11/0008 |
| 2023/0038987 A1* | 2/2023 | Kim | C08K 3/36 |
| 2023/0202235 A1* | 6/2023 | Ono | B60C 1/0016 |

FOREIGN PATENT DOCUMENTS

| | | | |
|---|---|---|---|
| JP | 2018150420 A | * | 9/2018 |
| JP | 2019-104877 A | | 6/2019 |
| JP | 2020-164107 A | | 10/2020 |
| JP | 2021107502 A | * | 7/2021 |

OTHER PUBLICATIONS

Japanese Office Action for Japanese Application No. 2022-101547, dated Mar. 4, 2024, with a brief explanation.

* cited by examiner

*Primary Examiner* — Cedrick S Williams

(74) *Attorney, Agent, or Firm* — Birch, Stewart, Kolasch & Birch, LLP

(57) ABSTRACT

An object of the present invention is to improve propulsion performance on a snow-covered road surface, and provided is a tire with a tread portion having a groove, wherein the cap rubber layer forming the tread portion contains 40 parts by mass or more and 80 parts by mass or less of styrene-butadiene rubber (SBR) having a styrene content of 25% by mass or less in 100 parts by mass of its rubber component, and 60 parts by mass or more of a filler with respect to 100 parts by mass of the rubber component, and is formed from a rubber composition having a loss tangent 10° C. tan δ measured under the conditions of temperature of 10° C., frequency of 10 Hz, initial strain of 5%, and dynamic strain rate of 1% and in deformation mode; tensile of less than 0.28, and a glass transition temperature Tg (° C.) of −40° C. or lower; and the glass transition temperature Tg (° C.) and the depth G (mm) of the groove satisfy Tg≤−0.5×G−35.

12 Claims, No Drawings

// TIRE

TECHNICAL FIELD

The present invention relates to a tire.

BACKGROUND ART

For the purpose of ensuring safe driving even in winter, it has been proposed to modify, devise or the like the rubber composition and surface shape that make up the tread portion of winter tires and all-weather (all season) tires (for example, Patent documents 1 to 3).

PRIOR ART DOCUMENTS

Patent Documents

[Patent document 1] JP2021-107502 A
[Patent document 2] JP2019-104877 A
[Patent document 3] JP2020-164107 A

SUMMARY OF INVENTION

Problem to be Solved by the Invention

However, even in the above proposal, there is room for improvement in terms of vehicle running performance in winter. Particularly, even with recent improvements in vehicle performance, there is a concern that tires will spin when the amount of snowfall increases and the tread portion does not come to contact with the road surface material such as asphalt, making it impossible to escape from snowy areas. Therefore, further improvement is desired for propulsion performance on a snow-covered road surface.

Accordingly, an object of the present invention is to improve propulsion performance on a snow-covered road surface.

Means for Solving the Problem

The present invention is a tire with a tread portion having a groove, wherein the cap rubber layer forming the tread portion
contains 40 parts by mass or more and 80 parts by mass or less of styrene-butadiene rubber (SBR) having a styrene content of 25% by mass or less in 100 parts by mass of its rubber component, and 60 parts by mass or more of a filler with respect to 100 parts by mass of the rubber component, and is formed from a rubber composition having a loss tangent 10° C. tan δ measured under the conditions of temperature of 10° C., frequency of 10 Hz, initial strain of 5%, and dynamic strain rate of 1% and in deformation mode; tensile of less than 0.28, and a glass transition temperature Tg (° C.) of −40° C. or lower; and
the glass transition temperature Tg (° C.) and the depth G (mm) of the groove satisfy the following (formula 1).

$$Tg \leq -0.5 \times G - 35 \quad \text{(formula 1)}$$

Effect of the Invention

According to this invention, the propulsion performance on a snow-covered road surface can be improved.

EMBODIMENTS FOR CARRYING OUT THE INVENTION

[1] Features of the Tire According to the Present Invention

First, the features of the tire according to the present invention will be explained.
1. Overview The tire according to the present invention is a tire with a tread portion having grooves, and the cap rubber layer forming the tread portion is formed from a rubber composition which contains 40 parts by mass or more and 80 parts by mass or less of SBR having a styrene content of 25% by mass or less in 100 parts by mass of the rubber component and 60 parts by mass or more of a filler with respect to 100 parts by mass of the rubber component. The rubber composition has a loss tangent 10° C. tan δ measured under the conditions of temperature 10° C., frequency 10 Hz, initial strain 5%, and dynamic strain rate 1%, and in deformation mode: tensile, of less than 0.28. At the same time, it has a glass transition temperature Tg (° C.) of −40° C. or lower. Furthermore, in the tire according to the present invention, the glass transition temperature Tg (° C.) and the groove depth G (mm) satisfy the following (formula 1).

$$Tg \leq -0.5 \times G - 35 \quad \text{(formula 1)}$$

Here, the cap rubber layer refers to a rubber layer provided on the outer side in the radial direction of the tire, but is not limited to the rubber layer forming the outermost layer of the tread portion. If there are two or more layers within 5 mm from the tread surface toward the inside, at least any one layer may satisfy the requirements of the rubber composition.

By having these features, as will be described later, it is possible to improve the propulsion performance on a snow-covered road surface.
2. Mechanism of Effect Manifestation in Tire According to the Present Invention The mechanism of effect manifestation in the tire according to the present invention is considered as follows.

When the tire runs on a snow-covered road, it is considered necessary to shovel snow on the road surface and run. At this time, it is considered that the tire obtains propulsion by compressing the snow on the road surface and taking it into the grooves of the tread as a snow column, and then expelling the snow column from the groove by the rotation of the tire.

The cap rubber layer of the tire according to the present invention is formed from a rubber composition which contains 40 parts by mass or more and 80 parts by mass or less of SBR having a styrene content of 25% by mass or less in in 100 parts by mass of the rubber component, and contains 60 parts by mass or more of a filler with respect to 100 parts by mass of the rubber component.

By containing 40 parts by mass or more and 80 parts by mass or less of SBR having a styrene content of 25% by mass or less in 100 parts by mass of the rubber component, a network of a small amount of styrene domains can be properly formed in the rubber matrix.

The formation of this styrene domain network makes it possible to smoothly transmit force in the tread portion, so the tread portion is easily deformed and restored, and the snow that has been taken into the grooves is efficiently pressed on the tread surface.

On the other hand, the styrene domains may generate heat in microscopic regions due to friction with other molecular chains in the rubber matrix, melting the surface of the snow pillars taken into the grooves and making it difficult to discharge them from the grooves.

In the present invention, as described above, a small amount of styrene domain network is properly formed, so heat generation in the micro region is suppressed while maintaining the ease of transmission of force in the tread portion. As a result, melting of the surface of the snow column taken into the groove can be suppressed, and the snow column can be easily discharged from the groove, thereby improving the propulsion performance on a snow-covered road surface.

The styrene content mentioned above is more preferably 20% by mass or less, and further preferably 15% by mass or less. On the other hand, as the lower limit, it is preferably 3% by mass or more, more preferably 5% by mass or more, and further preferably 8% by mass or more.

In the present invention, the phrase "contains 40 parts by mass or more and 80 parts by mass or less of SBR having a styrene content of 25% by mass or less in 100 parts by mass of the rubber component" indicates that the amount of SBR in 100 parts by mass of the rubber component is 40 parts by mass or more and 80 parts by mass or less, and the styrene content in the entire SBR is 25% by mass or less.

That is, when a styrene-containing polymer (SBR) is contained alone in the rubber component, it indicates that the styrene content in the polymer is 25% by mass or less, and when multiple styrene-containing polymers (SBR) are contained in the rubber component, it shows that the styrene content obtained from the sum of the products of the styrene content (mass %) in each polymer and the compounding amount (mass parts) per 100 mass parts of the rubber component of the polymer is 25 mass % or less.

More specifically, when 100 parts by mass of the rubber component contains SBR1 (X1 parts by mass) with a styrene content of S1 mass % and SBR2 (X2 parts by mass) with a styrene content of S2 mass %, it is indicated that the styrene content calculated from the formula $\{(S1 \times X1)+(S2 \times X2)\}/(X1+X2)$ is 25% by mass or less.

In addition, in the vulcanized rubber composition, it is possible to calculate by determining the amount of styrene contained in the rubber component after acetone extraction by solid-state nuclear magnetic resonance (solid-state NMR) or Fourier transform infrared spectrophotometer (FTIR).

In the tire according to the present invention, a large amount of 60 parts by mass or more of the filler is contained with respect to 100 parts by mass of the rubber component. As a result, within the cap layer, in addition to the network of styrene domains described above, a network of fillers can also be formed, which further facilitates the transmission of force. As a result, the cap layer is sufficiently deformed and restored, and the snow that has been taken into the grooves can be efficiently pressed down and discharged from the grooves. It is more preferably 80 parts by mass or more, and further preferably 90 parts by mass or more. On the other hand, although the upper limit is not particularly limited, it is preferably 180 parts by mass or less, more preferably 150 parts by mass or less, and further preferably 120 parts by mass or less in consideration of kneading processability.

In the tire according to the present invention, the loss tangent 10° C. tan δ of the rubber composition forming the cap rubber layer measured under the conditions of temperature of 10° C., frequency of 10 Hz, and initial strain of 5%, and dynamic strain rate of 1%, deformation mode: tensile is reduced to less than 0.28.

The loss tangent tan δ is a viscoelastic parameter that indicates energy absorption performance, and the smaller the value, the more the heat generation due to rubber deformation can be suppressed. In the present invention, 10° C. tan δ, where 10° C. is lower than room temperature, is set to less than 0.28, as described above, taking into consideration the temperature inside the rubber when running on a snow-covered road surface during snowfall. As a result, heat generation due to deformation of the rubber at low temperatures is sufficiently suppressed, and temperature rise of the tread and melting of the surface of the snow pillars caught in the grooves are suppressed, allowing them to easily be scraped out and discharged from the grooves. It is more preferably 0.27 or less, further preferably 0.26 or less, further preferably 0.25 or less, further preferably 0.24 or less, and further preferably 0.23 or less. On the other hand, the lower limit is not particularly limited, but it is preferably 0.05 or more, more preferably 0.08 or more, and further preferably 0.11 or more.

As described above, the tire according to the present invention is intended to improve propulsion performance on snow-covered roads, but in actual running, it is assumed that the tire will run on normal roads and on snowy and icy roads. Therefore, in the tire according to the present invention, as the loss tangent assuming running on a normal road surface, 30° C. tan δ is preferably 0.27 or less, more preferably 0.26 or less, further preferably 0.25 or less, further preferably 0.24 or less, further preferably 0.23 or less, further preferably 0.22 or less, further preferably 0.21 or less, and further preferably 0.20 or less. On the other hand, although the lower limit is not particularly limited, it is preferably 0.05 or more, more preferably 0.08 or more, and even more preferably 0.11 or more. In addition, as a loss tangent assuming running on an ice-snow road surface, 0° C. tan δ is preferably 0.33 or less, more preferably 0.32 or less, further preferably 0.31 or less, further preferably 0.30 or less, further preferably 0.29 or less, further preferably 0.28 or less, further preferably 0.27 or less, further preferably 0.26 or less, and further preferably 0.24 or less. On the other hand, the lower limit is not particularly limited, but it is preferably 0.06 or more, more preferably 0.10 or more, and further preferably 0.13 or more.

In the above, the loss tangent (tan δ) can be measured using a viscoelasticity measuring device such as "Eplexor (registered trademark)" manufactured by GABO.

Further, the tan δ at 0° C., 10° C. and 30° C. can be appropriately adjusted depending on the compounding amounts and types of compounding materials described later. For example, the tan δ at each temperature can be lowered by reducing the SBR content in the rubber component, reducing the styrene content in the SBR component, reducing the content of fillers, reducing the content of resin components, and increasing the content of vulcanizing agents such as sulfur and accelerators. On the other hand, the tan δ at each temperature can be increased by, for example, increasing the SBR content in the rubber component, increasing the styrene content in the SBR component, increasing the content of fillers, increasing the content of resin components, reducing the content of sulfur, accelerators, etc.

On the other hand, the grooves provided in the tread portion have a larger groove volume as the grooves become deeper, and take in more snow, which can increase the shear stress during discharge on the snow pillars that are pressed down in the grooves. On the other hand, the force for pressing the snow into the snow column tends to disperse, making it difficult to obtain propulsive force efficiently.

Therefore, in the present invention, the glass transition temperature Tg (° C.) of the rubber composition is −40° C.

or lower, and the glass transition temperature Tg (° C.) is set to a sufficiently low value with respect to the groove depth. In particular, it is set so that the glass transition temperature Tg (° C.) and the groove depth G (mm) satisfy the relationship Tg≤−0.5×G−35. The (−0.5×G−35) is not particularly limited as long as it is Tg or more, but the lower limit of the difference {(−0.5×G−35)−Tg} is, for example, 0 or more, and as the upper limit, it is, for example, 10 or less.

As a result, even in deep grooves, the tread can be flexibly deformed and restored, suppressing the dispersion of the force required to press down the snow, allowing more snow to be taken in and pressed down, and the propulsive force can be obtained efficiently. It is more preferable that Tg≤−0.5×G−42. Here, (−0.5×G−42) is not particularly limited as long as it is Tg or more, but the lower limit of the difference {(−0.5×G−42)−Tg} is, for example, 0 or more, and the upper limit is, for example, 5 or less.

The glass transition temperature Tg (° C.) is more preferably −42° C. or lower, further preferably −47° C. or lower, further preferably −48° C. or lower, and further preferably −50° C. or lower. Although the lower limit of the glass transition temperature Tg (° C.) is not particularly limited, it is preferably −75° C. or higher, more preferably −65° C. or higher, and further preferably −55° C. or higher.

The glass transition temperature (Tg) of the rubber composition described above can be obtained from the temperature distribution curve of tan δ measured using a viscoelasticity measuring device such as Eplexor series manufactured by GABO, under the conditions of frequency of 10 Hz, initial strain of 10%, amplitude of ±0.5%, and heating rate of 2° C./min. In the case of the present invention, the temperature corresponding to the largest tan δ value within the range of −80° C. or higher and 40° C. or lower in the measured temperature distribution curve is defined as the glass transition temperature (Tg). If there are two or more points with the largest tan δ value within the range of −80° C. or higher and 40° C. or lower, the point with the lowest temperature is taken as Tg. For example, in the present invention, if the largest value of tan δ is in the range of −80° C. or more and 40° C. or less, the temperature showing the largest value is Tg according to the above definition. In addition, for example, if, tan δ gradually decreases as the temperature rises, in the range of −80° C. or more and 40° C. or less, the glass transition temperature (Tg) is −80° C.

Further, the glass transition temperature (Tg) of the rubber composition described above can be appropriately adjusted by the compounding materials described later. For example, the Tg can be lowered by reducing the SBR content in the rubber component, reducing the styrene content in the SBR component, or reducing the compounding amount of the resin component, or the like. On the other hand, Tg can be increased by increasing the SBR content in the rubber component, increasing the styrene content in the SBR component, increasing the compounding amount of the resin component, or the like.

In the present invention, the term "groove" refers to an opening having a width of 3 mm or more on the outermost surface of the tread portion and a depth of 3 mm or more. It is preferable that a plurality of the grooves is provided on the tread surface, and when a plurality of grooves is provided, the depth of the deepest one among the grooves is defined as the "groove depth".

The groove may be a groove that communicates with the tire circumferential direction, and may be angled with respect to the tire circumferential direction or may be curved. From the viewpoint of pressing down the snow on the snow-covered road surface and making it easier to scrape it out, if the grooves are communicated in the circumferential direction, a zigzag shape, a curved shape, or a wavy shape formed by grooves having an angle with respect to the circumferential direction is preferable. Moreover, when the tread portion has a circumferential groove, it is preferable to have a groove that crosses a plurality of land portions separated by the groove and the ground contact edge portion.

The "groove depth" refers to the height from the groove bottom to the opening in the radial direction of the tire under standardized state and no load. The standardized state refers to that the rim is installed in the normal rim and the standardized internal pressure is applied. In the case of non-linear grooves or stepped grooves, the maximum depth from the opening is defined as "groove depth".

In addition, the "standardized rim" described above is a rim defined for each tire in the standard system including the standard on which the tire is based. For example, in the case of JATMA (Japan Automobile Tire Association), it is the standard rim in applicable sizes described in the "JATMA YEAR BOOK", in the case of "ETRTO (The European Tire and Rim Technical Organization)", it is "Measuring Rim" described in "STANDARDS MANUAL", and in the case of TRA (The Tire and Rim Association, Inc.), it is "Design Rim" described in "YEAR BOOK". JATMA, ETRTO, and TRA are referred to in that order, and if there is an applicable size at the time of reference, that standard is followed. In the case of tires that are not specified in the standard, it refers a rim that can be assembled and can maintain internal pressure, that is, the rim that does not cause air leakage from between the rim and the tire, and has the smallest rim diameter, and then the narrowest rim width.

Note that, the "standardized internal pressure" is the air pressure specified for each tire by the above-mentioned standards, and is the maximum air pressure for JATMA, "INFLATION PRESSURE" for ETRTO, and the maximum value described in the table "TIRE LOAD LIMITS AT VARIOUS COLD INFLATION PRESSURES" for TRA. As in the case of "standardized rim", refer to JATMA, ETRTO, and TRA in that order, and their standards are followed. And, in the case of a tire that is not defined in the standard, it is the standardized internal pressure (however, 250 kPa or more) of another tire size (specified in the standard) for which the standardized rim is described as the standard rim. When a plurality of standardized internal pressures of 250 kPa or more are listed, the minimum value among them is referred.

Also, the "grounding edge" refers to the edge that provides the maximum ground contact width when a standardized load is applied in a state where the tire is installed in a normal rim and filled with air at a standardized internal pressure. The normal rim and normal internal pressure are as described above.

The "standardized load" is the load defined for each tire by the standards in the standard system including the standard on which the tire is base and refers to the maximum mass that can be loaded on the tire, and is the maximum load capacity for JATMA, "LOAD CAPACITY" for ETRTO, and the maximum value described in "TIRE LOAD LIMITS AT VARIOUS COLD INFLATION PRESSURES" for TRA. As in the case of "standardized internal pressure", JATMA, ETRTO, and TRA are referred to in that order, and their standards are followed. Then, in the case of a tire not specified in the standard, the standardized load $W_L$ is obtained by the following calculation.

$$V=\{(Dt/2)^2-(Dt/2-Ht)^2\}\times\pi\times Wt$$

$$W_L=0.000011\times V+175$$

$W_L$: standardized load (kg)
V: virtual volume of tire (mm³)
Dt: tire outer diameter Dt (mm)
Ht: tire section height (mm)
Wt: cross-sectional width of tire (mm)

[2] A More Preferred Embodiment of the Tire According to the Present Invention

The tire according to the present invention can obtain even greater effects by adopting the following embodiments.

1. Filler

As described above, in the tire according to the present invention, a filler network is formed in the cap rubber layer by containing a large amount of filler of 60 parts by mass or more with respect to 100 parts by mass of the rubber component, making it easier to transmit forces within the cap layer.

In the present invention, it is preferable to use carbon black and silica as specific fillers, and (content of silica/content of carbon black) is preferably 3 or less. It is more preferable to increase the content of carbon black rather than silica, that is, (content of silica/content of carbon black) is more preferably less than one. Specifically, it is more preferably 0.8 or less, and further preferably 0.6 or less. Although the lower limit is not particularly limited, it is preferably 0.2 or more, and more preferably 0.3 or more.

By containing silica, the cap rubber layer becomes flexible and easier to deform, making it easier to take in the snow in the grooves. However, when the content of silica is higher than the content of carbon black, the reinforcing property of the carbon black is reduced, the cap rubber layer becomes too flexible, and the ability to press down snow decreases. For this reason, it is preferable that the content of carbon black is larger than that of silica, so that the cap rubber layer can be easily slightly deformed and it becomes easier to obtain the power to press down snow.

2. Multi-Layered Tread

In the present invention, the tread portion may be formed of only one layer of the cap rubber layer, or may be formed of two layers by providing a base rubber layer inside the cap rubber layer. In addition, it may have three layers, four layers or more. In this case, the thickness of the cap rubber layer occupied by the entire tread portion is preferably 10% or more, and more preferably 70% or more, in consideration of sufficient uptake of snow.

In the present invention, the "thickness of the tread portion" refers to the thickness of the tread portion on the tire equatorial plane in the cross section in the tire radial direction. When the tread portion is formed of a single rubber composition, it refers to the thickness of the rubber composition, and in the case of a laminated structure of multiple rubber compositions, which will be described later, it refers to the total thickness of these layers. When the tire has a groove on the equatorial plane, it refers to the thickness from the intersection of a straight line connecting the radially outermost end points of the groove with the tire equatorial plane to the radially innermost interface of the tread portion. The tread portion is a member in the area forming the contact surface of the tire, and refers to a portion radially outside of members including fiber materials such as carcass, belt layer, and belt reinforcing layer. The thickness of the tread portion can be measured by aligning the bead portion with the standardized rim width in a cross section obtained by cutting the tire in the radial direction.

The "thickness of the cap rubber layer" refers to the thickness of the cap rubber layer on the tire equatorial plane in the tire radial cross section. In case the tire has a groove on the tire equatorial plane, it refers to the thickness from the intersection of the straight line connecting the radially outermost endpoints of the groove and the tire equatorial plane to the interface with the innermost base rubber layer of the tread portion in the radial direction of the tire. The "thickness of the base rubber layer" refers to the thickness from the interface with the cap rubber layer to the innermost interface in the tire radial direction of the tread portion.

In this case, it is preferably that tan δ of the base rubber layer at each of the above temperatures (0° C., 10° C., 30° C.) is smaller than each tan δ in the cap rubber layer from the viewpoint of enhancing the resilience against deformation of the tread portion to press down the snow on snowy roads.

7. Acetone Extractables of Cap Rubber Layer (AE)

In the present invention, the acetone extractable content (AE) of the cap rubber layer is preferably 11% by mass or more, more preferably 11.4% by mass or more, further preferably 11.8% by mass or more, further preferably 12.4% by mass or more, further preferably 13% by mass or more, further preferably 13.5% by mass or more, further preferably 13.8% by mass or more, further preferably 15% by mass or more, further preferably 15.2% by mass or more, and further preferably 15.5% by mass or more. On the other hand, although the upper limit is not particularly limited, it is preferably 25% by mass or less, more preferably 20% by mass or less, further preferably 17% by mass or less, and further preferably 16.5% by mass or less.

The acetone extractable content (AE) can be considered as an index indicating the amount of softening agent and the like in the rubber composition, and can also be considered as an index indicating the softness of the rubber composition. Therefore, by controlling the amount of AE in the cap rubber layer as described above, the cap rubber layer is appropriately deformed, making it easier to obtain the force to press down the snow.

Note that the acetone extractable content (AE) can be measured in accordance with JIS K 6229:2015. Specifically, a vulcanized rubber test piece cut out from the measurement site is immersed in acetone at room temperature and normal pressure for 72 hours, and the weight loss rate (%) of the test piece is determined to obtain AE (% by mass).

More specifically, each vulcanized rubber test piece is immersed in acetone at room temperature and normal pressure for 72 hours to extract soluble components; the mass of each test piece before and after extraction is measured; and the acetone-extractable content can be calculated by the following formula.

Acetone-extractable content (%)={(mass of rubber test piece before extraction−mass of rubber test piece after extraction)/(mass of rubber test piece before extraction)}×100

Moreover, the above-mentioned acetone extraction content can be appropriately changed by changing the compounding ratio of the plasticizer in the rubber composition.

4. Ratio of 10° C. Tan δ to Groove Depth

In the tire according to the present invention, the ratio of 10° C. tan δ to the groove depth G (mm) (10° C. tan δ/G) is preferably 0.030 or less, more preferably 0.027 or less, further preferably 0.025 or less, further preferably 0.022 or less, further preferably 0.020 or less, further preferably 0.0193 or less, further preferably 0.0192 or less, further preferably 0.0186 or less, further preferably 0.0171 or less, and further preferably 0.0164 or less. It is considered necessary to press down and harden the snow pillars taken into the grooves by the cap rubber layer and discharge them when obtaining propulsive force on the snow-covered road surface. It is considered that 10° C. tan δ indicates heat generation at low temperatures and is a phase difference in response to deformation. Therefore, it is considered that by sufficiently reducing the value of 10° C. tan δ with respect to the groove depth, the snow on the snow-covered road surface can be efficiently pressed down and the snow pillars can be easily discharged. Although the lower limit of 10° C. tan δ/G is not particularly limited, it is preferably 0.008 or more, more preferably 0.010 or more, and further preferably 0.012 or more.

5. Land Ratio

In the tire according to the present invention, the land ratio in the tread portion of the tire installed on a standardized rim and having a standardized internal pressure is preferably 40% or more.

"Land ratio" is the ratio of the actual contact area to the virtual contact area filled with all the grooves on the surface of the tread portion. By setting the land ratio to 40% or more, it becomes easier to press down and harden the snow appropriately, and sufficient propulsion performance can be stably obtained. On the other hand, it is preferable to set the land ratio to 95% or less. As a result, snow can be sufficiently taken into the grooves of the tread portion.

In addition, the product of the content (parts by mass) of styrene-butadiene rubber (SBR) having a styrene content of 25% by mass or less in 100 parts by mass of the rubber component and the land ratio (%) in the tread portion (SBR content×land ratio) is preferably 7200 or less, more preferably 7000 or less, further preferably 6700 or less, further preferably 6200 or less, further preferably 6000 or less, and further preferably 5700 or less. As a result, the propulsion performance on the snow-covered road surface can be further improved by cooperating with the effect of the styrene domain network.

The lower limit of the product of the content of the styrene-butadiene rubber having a styrene content of 25% by mass or less and the land ratio in the tread portion (SBR content×land ratio) is not particularly limited, but it is preferably 2500 or more, more preferably 2520 or more, further preferably 2700 or more, further preferably 2800 or more, further preferably 3000 or more, further preferably 3500 or more, further preferably 3800 or more, further preferably 3900 or more, further preferably 4000 or more, further preferably 4500 or more, further preferably 5000 or more, and further preferably 5040 or more.

The above land ratio can be obtained from the ground contact shape under standardized rim, standardized internal pressure, and standardized load conditions.

Specifically, the tire is installed on a standardized rim, a standardized internal pressure is applied, and the tire is allowed to stand at 25° C. for 24 hours). Thereafter, an ink is printed on the tire tread surface, a standardized load is applied and then the tire tread surface is pressed against a thick paper (camber angle is 0°) to transfer the ink to the paper. Thus, the contact shape can be obtained. The transfer is made at five locations by rotating the tire by 72° in the circumferential direction. That is, the ground contact shape is obtained five times. At this time, for each of the five ground contact shapes, the discontinuous portions with the outline grooves are smoothly connected, and the resulting shape is defined as a virtual contact surface.

Then, the land ratio can be obtained from (average area of the five ground contact shapes (black portions) transferred to the thick paper/average of the areas of virtual contact surfaces obtained from the five ground contact shapes)×100 (%).

6. Aspect Ratio

The aspect ratio indicates the ratio of the cross-sectional height to the tire cross-sectional width of the tire. The smaller this ratio, a large ground contact area is secured and a lot of snow can be taken into the tread portion and discharged. As a result, it is possible to improve the propulsion performance on the snow-covered road surface. In the present invention, the specific aspect ratio is preferably 80% or less. As the lower limit, it is preferably 60% or more.

In addition, the product of the silica content (parts by mass) with respect to 100 parts by mass of the rubber component and the aspect ratio (%) (silica content×aspect ratio) is preferably 9800 or less, more preferably 9300 or less, further preferably 9000 or less, further preferably 8500 or less, further preferably 8000 or less, further preferably 7000 or less, and further preferably 6500 or less. As a result, in cooperation with the effect of the silica network, it is possible to further improve the propulsion performance on the snow-covered road surface.

Lower limit of the product of the silica content and the aspect ratio (%) (silica content×aspect ratio) is not particularly limited, but it is preferably 500 or more, more preferably 1000 or more, further preferably 1500 or more, further preferably 1800 or more, further preferably 2000 or more, further preferably 2500 or more, further preferably 2800 or more, further preferably 3000 or more further preferably 3500 or more, further preferably 3850 or more, further preferably 4000 or more, further preferably 4500 or more, further preferably 5000 or more and further preferably 5250 or more.

Note that the above aspect ratio (%) can be obtained by the following formula based on the cross-sectional height Ht (mm), the cross-sectional width Wt (mm), the tire outer diameter Dt (mm), and the rim diameter R (mm) when the internal pressure is 250 kPa.

$$\text{Aspect ratio } (\%) = (Ht/Wt) \times 100(\%)$$

$$Ht = (Dt - R)/2$$

[3] Embodiment

The present invention will be specifically described below based on embodiments.

1. Rubber Composition Forming Cap Layer

In the tire according to the present invention, the rubber composition forming the cap rubber layer can be obtained by adjusting appropriately the type and amount of various compounding materials such as rubber components, fillers, plasticizers, vulcanizing agents, and vulcanization accelerators described below.

(1) Compounding Material (a) Rubber Component

The rubber component is not particularly limited, and rubbers (polymers) commonly used in the manufacture of tires can be used. Examples of the rubbers include diene rubbers such as isoprene based rubber, butadiene rubber (BR), styrene butadiene rubber (SBR), and nitrile rubber (NBR); butyl based rubber such as butyl rubber; and thermoplastic elastomers such as styrene butadiene styrene block copolymer (SBS) and styrene-butadiene copolymer (SB).

In the present invention, among these, from the point of including styrene in the rubber component, any one of styrene-based polymers such as SBR, SBS, and SB is included. Preferably SBR is included. These styrene-based polymers may be used in combination with other rubber components. For example, combination of SBR and BR, and combination of SBR, BR and isoprene rubber are preferable.

(a-1) SBR

The weight average molecular weight of SBR is, for example, more than 100,000 and less than 2,000,000. Further, in the present invention, as described above, the content of styrene in the SBR component is set to 25% by mass or less. It is more preferably 20% by mass or less, and further preferably 15% by mass or less. On the other hand, as the lower limit, it is preferably 3% by mass or more, more preferably 5% by mass or more, and further preferably 8% by mass or more.

The vinyl content (1,2-bonded butadiene content) of SBR is, for example, more than 5% by mass and less than 70% by mass.

It is more preferably 10% by mass or more and 45% by mass or less, and further preferably 15% by mass or more and 30% by mass or less. The vinyl content of SBR refers to the content of 1,2-bonded butadiene with respect to the entire butadiene portion in the SBR component. Further, structural identification of SBR (measurement of styrene content and vinyl content) can be performed using, for example, JNM-ECA series equipment manufactured by JEOL Ltd.

As described above, the content of SBR in 100 parts by mass of the rubber component is preferably 40 parts by mass or more and 80 parts by mass or less, more preferably 50 parts by mass or more and 70 parts by mass or less, and further preferably 55 parts by mass or more and 65 parts by mass or less.

The SBR is not particularly limited, and for example, emulsion-polymerized styrene-butadiene rubber (E-SBR), solution-polymerized styrene-butadiene rubber (S-SBR) and the like can be used. The SBR may be either a non-modified SBR or a modified SBR. In addition, hydrogenated SBR obtained by hydrogenating the butadiene portion of SBR may be used. Hydrogenated SBR may be obtained by subsequently hydrogenating the BR portion of SBR. Styrene, ethylene and butadiene may be copolymerized to give similar structures.

The modified SBR may be any SBR having a functional group that interacts with a filler such as silica. Examples thereof include end-modified SBR (end-modified SBR having the above functional group at the terminal) in which at least one end of the SBR is modified with a compound having the above functional group (modifying agent), main chain modified SBR having the functional group in the main chain, main chain terminal modified SBR having the functional group at the main chain and the terminal (for example, a main chain end modified SBR having the above functional group to the main chain and having at least one end modified with the above modifying agent), and end-modified SBR which is modified (coupled) with a polyfunctional compound having two or more epoxy groups in the molecule, and into which an epoxy group or hydroxyl group has been introduced.

Examples of the functional group include an amino group, an amide group, a silyl group, an alkoxysilyl group, an isocyanate group, an imino group, an imidazole group, a urea group, an ether group, a carbonyl group, an oxycarbonyl group, a mercapto group, a sulfide group, a disulfide group, a sulfonyl group, a sulfinyl group, a thiocarbonyl group, an ammonium group, an imide group, a hydrazo group, an azo group, a diazo group, a carboxyl group, a nitrile group, a pyridyl group, an alkoxy group, a hydroxyl group, an oxy group, and an epoxy group. In addition, these functional groups may have a substituent.

As modified SBR, for example, SBR modified with a compound (modifying agent) represented by the following formula can be used.

[Chemical 1]

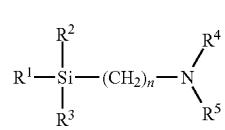

In the formula, $R^1$, $R^2$ and $R^3$ are the same or different and represent alkyl group, alkoxy group, silyloxy group, acetal group, carboxyl group (—COOH), mercapto group (—SH) or derivatives thereof. $R^4$ and $R^5$ are the same or different and represent hydrogen atoms or alkyl group. $R^4$ and $R^5$ may be combined to form a ring structure with nitrogen atoms. n represents an integer.

As the modified SBR modified by the compound (modifying agent) represented by the above formula, SBR, in which the polymerization end (active end) of the solution-polymerized styrene-butadiene rubber (S-SBR) is modified by the compound represented by the above formula (for example, modified SBR described in JP-A-2010-111753), can be used.

As $R^1$, $R^2$ and $R^3$, an alkoxy group is suitable (preferably an alkoxy group having 1 to 8 carbon atoms, more preferably an alkoxy group having 1 to 4 carbon atoms). As $R^4$ and $R^5$, an alkyl group (preferably an alkyl group having 1 to 3 carbon atoms) is suitable. n is preferably 1 to 5, more preferably 2 to 4, and even more preferably 3. Further, when $R^4$ and $R^5$ are combined to form a ring structure together with a nitrogen atom, a 4- to 8-membered ring is preferable. The alkoxy group also includes a cycloalkoxy group (cyclohexyloxy group, and the like) and an aryloxy group (phenoxy group, benzyloxy group, and the like).

Specific examples of the above modifying agent include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. These may be used alone or in combination of two or more.

Further, as the modified SBR, a modified SBR modified with the following compound (modifying agent) can also be used. Examples of the modifying agent include polyglycidyl ethers of polyhydric alcohols such as ethylene glycol diglycidyl ether, glycerin triglycidyl ether, trimethylolethanetriglycidyl ether, and trimethylolpropane triglycidyl ether;

polyglycidyl ethers of aromatic compounds having two or more phenol groups such as diglycidylated bisphenol A;

polyepoxy compounds such as 1,4-diglycidylbenzene, 1,3,5-triglycidylbenzene, and polyepoxidized liquid polybutadiene;

epoxy group-containing tertiary amines such as 4,4'-diglycidyl-diphenylmethylamine, and 4,4'-diglycidyl-dibenzylmethylamine;

diglycidylamino compounds such as diglycidylaniline, N,N'-diglycidyl-4-glycidyloxyaniline, diglycidyl ortho-toluidine, tetraglycidylmetaxylenidiamine, tetraglycidylaminodiphenylmethane, tetraglycidyl-p-phenylenediamine, diglycidylaminomethylcyclohexane, and tetraglycidyl-1,3-bisaminomethylcyclohexane;

amino group-containing acid chlorides such as bis-(1-methylpropyl) carbamate chloride, 4-morpholincarbonyl chloride, 1-pyrrolidincarbonyl chloride, N, N-dimethylcarbamide acid chloride, and N, N-diethylcarbamide acid chloride;

epoxy group-containing silane compounds such as 1,3-bis-(glycidyloxypropyl)-tetramethyldisiloxane, and (3-glycidyloxypropyl)-pentamethyldisiloxane;

sulfide group-containing silane compound such as (trimethylsilyl) [3-(trimethoxysilyl) propyl] sulfide, (trimethylsilyl) [3-(triethoxysilyl) propyl] sulfide, (trimethylsilyl) [3-(tripropoxysilyl) propyl] sulfide, (trimethylsilyl) [3-(tributoxysilyl) propyl] sulfide, (trimethylsilyl) [3-(methyldimethoxysilyl) propyl] sulfide, (trimethylsilyl) [3-(methyldiethoxysilyl) propyl] sulfide, (trimethylsilyl) [3-(methyldipropoxysilyl) propyl] sulfide, and (trimethylsilyl) [3-(methyldibutoxysilyl) propyl] sulfide;

N-substituted aziridine compound such as ethyleneimine and propyleneimine;

alkoxysilanes such as methyltriethoxysilane, N, N-bis (trimethylsilyl)-3-aminopropyltrimethoxysilane, N, N-bis (trimethylsilyl)-3-aminopropyltriethoxysilane, N, N-bis (trimethylsilyl) aminoethyltrimethoxysilane, and N, N-bis (trimethylsilyl) aminoethyltriethoxysilane;

(thio) benzophenone compound having an amino group and/or a substituted amino group such as 4-N, N-dimethylaminobenzophenone, 4-N, N-di-t-butylaminobenzophenone, 4-N, N-diphenylamino benzophenone, 4,4'-bis (dimethylamino) benzophenone, 4,4'-bis (diethylamino) benzophenone, 4,4'-bis (diphenylamino) benzophenone, and N, N, N', N'-bis-(tetraethylamino) benzophenone;

benzaldehyde compounds having an amino group and/or a substituted amino group such as 4-N, N-dimethylaminobenzaldehyde, 4-N, N-diphenylaminobenzaldehyde, and 4-N, N-divinylamino benzaldehyde;

N-substituted pyrolidone such as N-methyl-2-pyrrolidone, N-vinyl-2-pyrrolidone, N-phenyl-2-pyrrolidone, N-t-butyl-2-pyrrolidone, and N-methyl-5-methyl-2-pyrrolidone;

N-substituted piperidone such as methyl-2-piperidone, N-vinyl-2-piperidone, and N-phenyl-2-piperidone;

N-substituted lactams such as N-methyl-ε-caprolactam, N-phenyl-ε-caprolactum, N-methyl-ω-laurilolactum, N-vinyl-ω-laurilolactum, N-methyl-β-propiolactam, and N-phenyl-β-propiolactam; and N, N-bis-(2,3-epoxypropoxy)-aniline, 4,4-methylene-bis-(N, N-glycidylaniline), tris-(2,3-epoxypropyl)-1, 3,5-triazine-2,4,6-triones, N, N-diethylacetamide, N-methylmaleimide, N, N-diethylurea, 1,3-dimethylethylene urea, 1,3-divinylethyleneurea, 1,3-diethyl-2-imidazolidinone, 1-methyl-3-ethyl-2-imidazolidinone, 4-N, N-dimethylaminoacetophenone, 4-N, N-diethylaminoacetophenone, 1,3-bis (diphenylamino)-2-propanone, and 1,7-bis(methylethylamino)-4-heptanone. The modification with the above compound (modifying agent) can be carried out by a known method.

As the SBR, for example, SBR manufactured and sold by Sumitomo Chemical Co., Ltd., ENEOS Material Co., Ltd., Asahi Kasei Co., Ltd., Nippon Zeon Co., Ltd., etc. can be used. The SBR may be used alone or in combination of two or more.

(a-2) BR

In the present invention, the rubber composition may optionally contain BR as necessary. In this case, the content of BR in 100 parts by mass of the rubber component is preferably more than 20 parts by mass, and more preferably more than 30 parts by mass. On the other hand, it is preferably less than 50 parts by mass, more preferably less than 45 parts by mass.

The weight average molecular weight of BR is, for example, more than 100,000 and less than 2,000,000. The vinyl bond amount of BR is, for example, more than 1% by mass and less than 30% by mass. The cis content of BR is, for example, more than 1% by mass and less than 98% by mass. The trans content of BR is, for example, more than 1% by mass and less than 60% by mass.

The BR is not particularly limited, and BR having a high cis content (cis content of 90% or more), BR having a low cis content, BR containing syndiotactic polybutadiene crystals, and the like can be used. The BR may be either a non-modified BR or a modified BR, and examples of the modified BR include a modified BR into which the above-mentioned functional group has been introduced. These may be used alone or in combination of two or more. The cis content can be measured by infrared absorption spectrum analysis.

As the BR, for example, products of Ube Industries, Ltd., ENEOS Materials Co., Ltd., Asahi Kasei Co., Ltd., and Nippon Zeon Co., Ltd., etc. can be used.

(a-3) Isoprene Rubber

In the present invention, the rubber composition may optionally contain isoprene rubber as necessary. In this case, the content of the isoprene-based rubber in 100 parts by mass of the rubber component is preferably 20 parts by mass or more and 40 parts by mass or less.

Examples of the isoprene rubber include natural rubber (NR), isoprene rubber (IR), reformed NR, modified NR, and modified IR.

As NR, for example, those commonly used in the tire industry, such as SIR20, RSS #3, and TSR20, can be used. The IR is not particularly limited, and for example, IR 2200 or the like, which is commonly used in the tire industry, can be used. Reformed NR includes deproteinized natural rubber (DPNR), high-purity natural rubber (UPNR), etc., and modified NR includes epoxidized natural rubber (ENR), hydrogenated natural rubber (HNR), grafted natural rubber, etc. Examples of the modified IR include epoxidized isoprene rubber, hydrogenated isoprene rubber, and grafted isoprene rubber. These may be used alone or in combination of two or more.

(a-4) Other Rubber Components

Further, as other rubber components, rubbers (polymers) generally used for manufacturing tires, such as nitrile rubber (NBR), may be contained.

(b) Compounding Materials Other than Rubber Components (b-1) Filler

In the present invention, the rubber composition preferably contains a filler. Examples of specific fillers include silica, carbon black, graphite, calcium carbonate, talc, alumina, clay, aluminum hydroxide, and mica. As described above, among these, it is preferable to use silica and carbon black in combination. Furthermore, (silica content/content of carbon black) may be less than one.

(i-1) Silica

In the present invention, the rubber composition preferably contains silica, and preferably contains a silane coupling agent together with silica.

The BET specific surface area of silica is preferably more than 140 m$^2$/g, and more preferably more than 160 m$^2$/g from the viewpoint of obtaining good durability performance. On the other hand, it is preferably less than 300 m$^2$/g from the viewpoint of obtaining good rolling resistance during high-speed running. The BET specific surface area mentioned above is the value of N$_2$SA measured by the BET method according to ASTM D3037-93.

In the present invention, when the rubber composition contains silica, the average particle size is preferably 20 nm or less. By using silica having an average particle size of 20 nm or less, the frequency of contact with the polymer can be increased. Although the lower limit is not particularly limited, it is preferably 10 nm or more from the viewpoint of dispersibility during mixing.

When silica is used, the content of silica is preferably 30 parts by mass or more, more preferably 40 parts by mass or more, and further preferably 50 parts by mass or more with respect to 100 parts by mass of the rubber component. On the other hand, it is preferably 150 parts by mass or less, more preferably 100 parts by mass or less, and further preferably 60 parts by mass or less.

Examples of silica include dry silica (anhydrous silica) and wet silica (hydrous silica). Among them, wet silica is preferable because it has large number of silanol groups. Silica made from water-containing glass or the like, or silica made from biomass materials such as rice husks may also be used.

As the silica, products of Evonik Industries, Rhodia Co., Ltd., Tosoh Silica Co., Ltd., Solvay Japan Co., Ltd., and Tokuyama Co., Ltd., etc. can be used.

(i-2) Silane Coupling Agent

When silica is used, the rubber composition preferably contains a silane coupling agent together with silica. The silane coupling agent is not particularly limited, and examples thereof include sulfide-based ones such as bis(3-triethoxysilylpropyl)tetrasulfide, bis (2-triethoxysilylethyl)tetrasulfide, bis (4-triethoxysilylbutyl)tetrasulfide, bis(3-trimethoxysilylpropyl) tetrasulfide, bis(2-trimethoxysilylethyl) tetrasulfide, bis(2-triethoxysilylethyl)trisulfide, bis(4-trimethoxysilylbutyl) trisulfide, bis(3-triethoxysilylpropyl)disulfide, bis(2-triethoxysilylethyl) disulfide, bis(4-triethoxysilylbutyl) disulfide, bis(3-trimethoxysilylpropyl) disulfide, bis(2-trimethoxysilylethyl)disulfide, bis(4-trimethoxysilylbutyl)disulfide, 3-trimethoxysilylpropyl-N, N-dimethylthiocarbamoyltetrasulfide, 2-triethoxysilylethyl-N, N-dimethylthiocarbamoyltetrasulfide, and 3-triethoxysilylpropylmethacrylatemonosulfide;

mercapto-based ones such as 3-mercaptopropyltrimethoxysilane, 2-mercaptoethyltriethoxysilane, and NXT and NXT-Z manufactured by Momentive;

vinyl-based ones such as vinyl triethoxysilane, and vinyl trimethoxysilane;

amino-based ones such as 3-aminopropyltriethoxysilane and 3-aminopropyltrimethoxysilane;

glycidoxy-based ones such as γ-glycidoxypropyltriethoxysilane and γ-glycidoxypropyltrimethoxysilane;

nitro-based ones such as 3-nitropropyltrimethoxysilane, and 3-nitropropyltriethoxysilane; and chloro-based ones such as 3-chloropropyltrimethoxysilane, and 3-chloropropyltriethoxysilane. These may be used alone or in combination of two or more.

As the silane coupling agent, for example, products of Evonik Industries, Momentive Co., Ltd., Shin-Etsu Silicone Co., Ltd., Tokyo Chemical Industry Co., Ltd., Azumax Co., Ltd., Toray Dow Corning Co., Ltd., etc. can be used.

The content of the silane coupling agent is, for example, more than 3 parts by mass and less than 25 parts by mass with respect to 100 parts by mass of silica.

(ii) Carbon Black

In the present invention, the rubber composition preferably contains carbon black from the viewpoint of further reinforcing properties.

A specific content ratio of carbon black to 100 parts by mass of the rubber component is preferably 20 parts by mass or more, and more preferably 30 parts by mass or more. On the other hand, it is preferably 60 parts by mass or less, and more preferably 50 parts by mass or less.

Carbon black is not particularly limited, and examples thereof include furnace black (furnace carbon black) such as SAF, ISAF, HAF, MAF, FEF, SRF, GPF, APF, FF, CF, SCF and ECF; acetylene black (acetylene carbon black); thermal blacks (thermal carbon blacks) such as FT and MT; channel blacks (channel carbon blacks) such as EPC, MPC and CC.

In addition to conventional carbon black obtained by burning mineral oil, carbon black derived from vegetable oil and lignin may be used as appropriate, and a recycled carbon black obtained by decomposing waste tires and other rubber products may be used, also. These may be used individually by 1 type, and may be used 2 or more types together.

The CTAB specific surface area (Cetyl Tri-methyl Ammonium Bromide) of carbon black is preferably 130 m$^2$/g or more, more preferably 160 m$^2$/g or more, and further preferably 170 m$^2$/g or more. On the other hand, it is preferably 250 m$^2$/g or less, and more preferably 200 m$^2$/g or less. The CTAB specific surface area is a value measured according to ASTM D3765-92.

Specific carbon black is not particularly limited, and examples thereof include N134, N110, N220, N234, N219, N339, N330, N326, N351, N550, and N762. Commercially available products include, for example, products of Asahi Carbon Co., Ltd., Cabot Japan Co., Ltd., Tokai Carbon Co., Ltd., Mitsubishi Chemical Corporation, Lion Corporation, Shin Nikka Carbon Co., Ltd., Columbia Carbon Co., Ltd., etc. These may be used alone or in combination of two or more.

(iii) Other Fillers

The rubber composition may optionally contain fillers such as graphite, calcium carbonate, talc, alumina, clay, aluminum hydroxide, and mica, which are generally used in the tire industry, in addition to the above-mentioned silica and carbon black, as necessary. These contents are, for example, more than 0.1 part by mass and less than 200 parts by mass with respect to 100 parts by mass of the rubber component.

(b-2) Plasticizer Component

The rubber composition may contain oil, liquid rubber, and resin as plasticizer components as components for softening rubber. The plasticizer component is a component that can be extracted from the vulcanized rubber with acetone. The total content of the plasticizer component is preferably 25 parts by mass or more, more preferably 30 parts by mass or more, and further preferably 35 parts by mass or more, with respect to 100 parts by mass of the rubber component. On the other hand, it is preferably 55 parts by mass or less, more preferably 50 parts by mass or less, and further preferably 45 parts by mass or less. When the rubber component described above contains an extended rubber that has been previously extended with an oil, a resin, a liquid rubber component, or the like, the component for extending is included in the plasticizer component. For example, if it is an oil extended rubber, the amount of that oil is included in the oil content.

(i) Oil

Examples of the oil include mineral oils (commonly referred to as process oils), vegetable oils, or mixtures thereof. As the mineral oil (process oil), for example, a paraffinic process oil, an aroma-based process oil, a naphthene process oil, or the like can be used. Examples of the vegetable oils and fats include castor oil, cottonseed oil, linseed oil, rapeseed oil, soybean oil, palm oil, coconut oil, peanut oil, rosin, pine oil, pine tar, tall oil, corn oil, rice oil, beni-flower oil, sesame oil, olive oil, sunflower oil, palm kernel oil, camellia oil, jojoba oil, macadamia nut oil, and tung oil. These may be used alone or in combination of two or more. Moreover, from the viewpoint of life cycle assessment, waste oil after being used as a lubricating oil for mixers for rubber mixing, automobile engines, etc., waste cooking oil, and the like may be used as appropriate.

Specific examples of process oil (mineral oil) include products of Idemitsu Kosan Co., Ltd., Sankyo Yuka Kogyo Co., Ltd., ENEOS Corporation, Olisoy Co., Ltd., H&R Co., Ltd., Toyokuni Seiyu Co., Ltd., Showa Shell Sekiyu Co., Ltd., and Fuji Kosan Co., Ltd.

(ii) Liquid Rubber

The liquid rubber mentioned as the plasticizer is a polymer in a liquid state at room temperature (25° C.) and is a polymer having a monomer similar to that of solid rubber as a constituent element. Examples of the liquid rubber include farnesene-based polymers, liquid diene-based polymers, and hydrogenated additives thereof.

The farnesene-based polymer is a polymer obtained by polymerizing farnesene, and has a structural unit based on farnesene. Farnesene includes isomers such as α-farnesene ((3E, 7E)-3,7,11-trimethyl-1,3,6,10-dodecatetraene) and β-farnesene (7,11-dimethyl-3-methylene-1, 6,10-dodecatorien).

The farnesene-based polymer may be a homopolymer of farnesene (farnesene homopolymer) or a copolymer of farnesene and a vinyl monomer (farnesene-vinyl monomer copolymer).

Examples of the liquid diene polymer include a liquid styrene-butadiene copolymer (liquid SBR), a liquid butadiene polymer (liquid BR), a liquid isoprene polymer (liquid IR), and a liquid styrene isoprene copolymer (liquid SIR).

The liquid diene polymer has a polystyrene-converted weight average molecular weight (Mw) measured by gel permeation chromatography (GPC) of, for example, more than $1.0 \times 10^3$ and less than $2.0 \times 10^5$. In the present specification, Mw of the liquid diene polymer is a polystyrene conversion value measured by gel permeation chromatography (GPC).

The content of the liquid rubber (the total content of the liquid farnesene-based polymer, the liquid diene-based polymer, etc.) is, for example, more than 1 part by mass and less than 100 parts by mass with respect to 100 parts by mass of the rubber component.

As the liquid rubber, for example, products of Kuraray Co., Ltd., Clay Valley Co., Ltd., etc. can be used.

(iii) Resin Component

The resin component also functions as a tackifying component and may be solid or liquid at room temperature. Examples of the specific resin components include resins such as rosin-based resin, styrene-based resin, coumarone-based resin, terpene-based resin, C5 resin, C9 resin, C5C9 resin, and acrylic resins. Two or more of them may be used in combination. Content of the resin component is more than 2 parts by mass, preferably less than 45 parts by mass, and more preferably less than 30 parts by mass with respect to 100 parts by mass of the rubber component. These resin components may optionally be provided with modified groups capable of reacting with silica.

The rosin-based resin is a resin whose main component is rosin acid obtained by processing rosin. The rosin-based resins (rosins) can be classified according to the presence or absence of modification, and can be classified into unmodified rosin (non-modified rosin) and modified rosin (rosin derivative). Unmodified rosins include tall rosin (also known as tall oil rosin), gum rosin, wood rosin, disproportionated rosin, polymerized rosin, hydrogenated rosin, and other chemically modified rosins. The modified rosin is a modified compound of an unmodified rosin, and examples thereof include rosin esters, unsaturated carboxylic acid-modified rosins, unsaturated carboxylic acid-modified rosin esters, rosin amide compounds, and rosin amine salts.

The styrene-based resin is a polymer using a styrene monomer as a constituent monomer, and examples thereof include a polymer obtained by polymerizing a styrene monomer as a main component (50% by mass or more). Specifically, it includes homopolymers obtained by individually polymerizing styrene monomers (styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene, etc.), copolymers obtained by copolymerizing two or more styrene monomers, and, in addition, copolymers obtained by copolymerizing a styrene monomer and other monomers that can be copolymerized with the styrene monomer.

Examples of the other monomers include acrylonitriles such as acrylonitrile and methacrylonitrile; unsaturated carboxylic acids such as acrylic acid and methacrylic acid; unsaturated carboxylic acid esters such as methyl acrylate and methyl methacrylate; dienes such as chloroprene, butadiene, and isoprene, olefins such as 1-butene and 1-pentene; and α, β-unsaturated carboxylic acids such as maleic anhydride and acid anhydrides thereof.

As the coumarone-based resin, coumarone-indene resin is preferably used. Coumarone-indene resin is a resin containing coumarone and indene as monomer components constituting the skeleton (main chain) of the resin. Examples of the monomer component contained in the skeleton other than coumarone and indene include styrene, α-methylstyrene, methylindene, and vinyltoluene.

Content of the coumarone-indene resin is, for example, more than 1.0 parts by mass and less than 50.0 parts by mass with respect to 100 parts by mass of the rubber component.

The hydroxyl value (OH value) of the coumarone-indene resin is, for example, more than 15 mgKOH/g and less than 150 mgKOH/g. The OH value is the amount of potassium hydroxide required to neutralize acetic acid bonded to a hydroxyl group when 1 g of the resin is acetylated, and is expressed in milligrams. It is a value measured by potentiometric titration method (JIS K 0070: 1992).

The softening point of the coumarone-indene resin is, for example, higher than 30° C. and lower than 160° C. The softening point is the temperature at which the ball drops when the softening point defined in JIS K 6220-1: 2001 is measured by a ring-ball type softening point measuring device.

Examples of the terpene-based resins include polyterpenes, terpene phenols, and aromatic-modified terpene resins. Polyterpene is a resin obtained by polymerizing a terpene compound and a hydrogenated product thereof. The terpene compound is a hydrocarbon having a composition of $(C_5H_8)$ n or an oxygen-containing derivative thereof, which is a compound having a terpene classified as monoterpenes $(C_{10}H_{16})$, sesquiterpenes $(C_{15}H_{24})$, diterpenes $(C_{20}H_{32})$, etc. as the basic skeleton. Examples thereof include α-pinene, β-pinene, dipentene, limonene, myrcene, alloocimene, osimene, α-phellandrene, α-terpinene, γ-terpinene, terpinolene, 1,8-cineol, 1,4-cineol, α-terpineol, β-terpineol, and γ-terpineol.

Examples of the polyterpene include terpene resins such as α-pinene resin, β-pinene resin, limonene resin, dipentene resin, and β-pinene/limonene resin, which are made from the above-mentioned terpene compound, as well as hydrogenated terpene resin obtained by hydrogenating the terpene resin. Examples of the terpene phenol include a resin obtained by copolymerizing the above-mentioned terpene compound and the phenol compound, and a resin obtained by hydrogenating above-mentioned resin. Specifically, a resin obtained by condensing the above-mentioned terpene compound, the phenol compound and formalin can be mentioned. Examples of the phenol compound include phenol, bisphenol A, cresol, and xylenol. Examples of the aromatic-modified terpene resin include a resin obtained by modifying a terpene resin with an aromatic compound, and a resin obtained by hydrogenating the above-mentioned resin. The aromatic compound is not particularly limited as long as it is a compound having an aromatic ring, and examples thereof include phenol compounds such as phenol, alkylphenol, alkoxyphenol, and unsaturated hydrocarbon group-containing phenol; naphthol compounds such as naphthol, alkylnaphthol, alkoxynaphthol, and unsaturated hydrocarbon group-containing naphthols; styrene derivatives such as styrene, alkylstyrene, alkoxystyrene, unsaturated hydrocarbon group-containing styrene; coumarone; and indene.

The "C5 resin" refers to a resin obtained by polymerizing a C5 fraction. Examples of the C5 fraction include petroleum fractions having 4 to 5 carbon atoms such as cyclopentadiene, pentene, pentadiene, and isoprene. As the C5 based petroleum resin, a dicyclopentadiene resin (DCPD resin) is preferably used.

The "C9 resin" refers to a resin obtained by polymerizing a C9 fraction, which may be hydrogenated or modified. Examples of the C9 fraction include petroleum fractions having 8 to 10 carbon atoms such as vinyltoluene, alkylstyrene, indene, and methyl indene. As specific examples thereof, for example, a coumaron indene resin, a coumaron resin, an indene resin, and an aromatic vinyl resin are preferably used. As the aromatic vinyl resin, a homopolymer of α-methylstyrene or styrene or a copolymer of α-methylstyrene and styrene is preferable because it is economical, easy to process, and excellent in heat generation. A copolymer of α-methylstyrene and styrene is more preferred. As the aromatic vinyl-based resin, for example, those commercially available from Kraton Co. Ltd., Eastman Chemical Co. Ltd., etc. can be used.

The "C5-C9 resin" refers to a resin obtained by copolymerizing the C5 fraction and the C9 fraction, which may be hydrogenated or modified. Examples of the C5 fraction and the C9 fraction include the above-mentioned petroleum fraction. As the C5-C9 resin, for example, those commercially available from Tosoh Corporation, LUHUA Co. Ltd., etc. can be used.

Although the acrylic resin is not particularly limited, for example, a non-solvent type acrylic resin can be used.

As the solvent-free acrylic resin, a (meth) acrylic resin (polymer), synthesized by a high-temperature continuous polymerization method (high-temperature continuous lump polymerization method (a method described in U.S. Pat. No. 4,414,370 B, JP 84-6207 A, JP 93-58805 B, JP 89-313522 A, U.S. Pat. No. 5,010,166 B, Toa Synthetic Research Annual Report TREND2000 No. 3 pages 42-45, and the like) without using polymerization initiators, chain transfer agents, organic solvents, etc. as auxiliary raw materials as much as possible, can be mentioned. In the present invention, (meth) acrylic means methacrylic and acrylic.

Examples of the monomer component constituting the acrylic resin include (meth) acrylic acid, and (meth) acrylic acid derivatives such as (meth) acrylic acid ester (alkyl ester, aryl ester, aralkyl ester, etc.), (meth) acrylamide, and (meth) acrylamide derivative.

In addition, as the monomer component constituting the acrylic resin, aromatic vinyl compounds such as styrene, α-methylstyrene, vinyltoluene, vinylnaphthalene, divinylbenzene, trivinylbenzene, divinylnaphthalene, and the like may be used, together with (meth) acrylic acid or (meth) acrylic acid derivative.

The acrylic resin may be a resin composed only of a (meth) acrylic component or a resin also having a component other than the (meth) acrylic component. Further, the acrylic resin may have a hydroxyl group, a carboxyl group, a silanol group, or the like.

As the resin component, for example, a product of Maruzen Petrochemical Co., Ltd., Sumitomo Bakelite Co., Ltd., Yasuhara Chemical Co., Ltd., Toso Co., Ltd., Rutgers Chemicals Co., Ltd., BASF Co., Ltd., Arizona Chemical Co., Ltd., Nitto Chemical Co., Ltd., Co., Ltd., Nippon Catalyst Co., Ltd., ENEOS Co., Ltd., Arakawa Chemical Industry Co., Ltd., Taoka Chemical Industry Co., Ltd. can be used.

(b-3) Stearic Acid

In the present invention, the rubber composition preferably contains stearic acid. Content of stearic acid is, for example, more than 0.5 parts by mass and less than 10.0 parts by mass with respect to 100 parts by mass of the rubber component. As the stearic acid, conventionally known ones can be used, and, for example, products of NOF Corporation, Kao Corporation, Fuji film Wako Pure Chemical Industries, Ltd., and Chiba Fatty Acid Co., Ltd., etc. can be used.

(b-4) Anti-Aging Agent

In the present invention, the rubber composition preferably contains an antioxidant. The content of the anti-aging agent is, for example, more than 0.5 parts by mass and less than 10 parts by mass, and more preferably 1 part by mass or more with respect to 100 parts by mass of the rubber component.

Examples of the antiaging agent include naphthylamine-based antiaging agents such as phenyl-α-naphthylamine; diphenylamine-based antiaging agents such as octylated diphenylamine and 4,4'-bis (α, α'-dimethylbenzyl) diphenylamine; p-phenylenediamine-based anti-aging agent such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline-based anti-aging agent such as a polymer of 2,2,4-trimethyl-1,2-dihydroquinolin; monophenolic anti-aging agents such as 2,6-di-t-butyl-4-methylphenol, styrenated phenol; bis, tris, polyphenolic anti-aging agents such as tetrakis-[methylene-3-(3',5'-di-t-butyl-4'-hydroxyphenyl)propionate] methane. These may be used alone or in combination of two or more.

As the anti-aging agent, for example, products of Seiko Chemical Co., Ltd., Sumitomo Chemical Co., Ltd., Ouchi Shinko Chemical Industry Co., Ltd., Flexsys Co., Ltd., etc. can be used.

(b-5) Wax

In the present invention, the rubber composition preferably contains wax. Content of the wax is, for example, 0.5 to 20 parts by mass, preferably 1.0 to 15 parts by mass, and more preferably 1.5 to 10 parts by mass with respect to 100 parts by mass of the rubber component.

The wax is not particularly limited, and examples thereof include petroleum waxes such as paraffin wax and microcrystalline wax; natural waxes such as plant waxes and animal waxes; synthetic waxes such as polymers of ethylene and propylene. These may be used alone or in combination of two or more.

As the wax, for example, products of Ouchi Shinko Chemical Industry Co., Ltd., Nippon Seiro Co., Ltd., Seiko Chemical Co., Ltd., etc. can be used.

(b-6) Zinc Oxide

The rubber composition may contain zinc oxide. Content of the zinc oxide is, for example, more than 0.5 parts by mass and less than 10 parts by mass with respect to 100 parts by mass of the rubber component. As the zinc oxide, conventionally known ones can be used, for example, products of Mitsui Mining & Smelting Co., Ltd., Toho Zinc Co., Ltd., Hakusui Tech Co., Ltd., Shodo Chemical Industry Co., Ltd., Sakai Chemical Industry Co., Ltd., etc. can be used.

(b-7) Processing Aid

The rubber composition may also contain processing aids. As the processing aids, for example, fatty acid metal salts, fatty acid amides, amide esters, silica surfactants, fatty acid esters, mixtures of fatty acid metal salts and amide esters, mixtures of fatty acid metal salts and fatty acid amides, and the like can be used. For example, products of Rhein Chemie Co., Ltd., Structol Co., Ltd., etc. can be used. These may be used alone or in combination of two or more. Among them, fatty acid metal salts are preferred.

Fatty acids constituting fatty acid metal salts include saturated or unsaturated fatty acids (preferably saturated or unsaturated fatty acids having 6 to 28 carbon atoms (more preferably having 10 to 25 carbon atoms, and further preferably having 14 to 20 carbon atoms)). Examples thereof include lauric acid, myristic acid, palmitic acid, stearic acid, oleic acid, linoleic acid, linolenic acid, arachidic acid, behenic acid, and nervonic acid. These can be used singly or in combination of two or more. Among them, saturated fatty acids are preferred, and saturated fatty acids having 14 to 20 carbon atoms are more preferred.

Examples of metals constituting the fatty acid metal salt include alkali metals such as potassium and sodium, alkaline earth metals such as magnesium, calcium and barium, zinc, nickel and molybdenum. These may be used alone or in combination of two or more. Among them, zinc is preferable.

Content of the processing aid is preferably 0.5 parts by mass or more, more preferably 1.5 parts by mass or more, and further preferably 2 parts by mass or more with respect to 100 parts by mass of the rubber component. On the other hand, it is preferably 8 parts by mass or less, more preferably 6 parts by mass or less, and further preferably 4 parts by mass or less.

(b-8) Cross-Linking Agent and Vulcanization Accelerator

The rubber composition preferably contains a cross-linking agent such as sulfur. Content of the cross-linking agent is, for example, more than 0.1 parts by mass and less than 10.0 parts by mass with respect to 100 parts by mass of the rubber component.

Examples of sulfur include powdered sulfur, precipitated sulfur, colloidal sulfur, insoluble sulfur, highly dispersible sulfur, and soluble sulfur, which are commonly used in the rubber industry. These may be used alone or in combination of two or more.

As the sulfur, for example, products of Tsurumi Chemical Industry Co., Ltd., Karuizawa Sulfur Co., Ltd., Shikoku Chemicals Corporation, Flexsys Co., Ltd., Nippon Kanryu Kogyo Co., Ltd., Hosoi Chemical Industry Co., Ltd., etc. can be used.

Examples of the cross-linking agent other than sulfur include vulcanizing agents containing a sulfur atom such as Tackirol V200 manufactured by Taoka Chemical Industry Co., Ltd., and KA9188 (1,6-bis (N, N'-dibenzylthiocarbamoyldithio) hexane) manufactured by Lanxess Co., Ltd.; and organic peroxides such as dicumyl peroxide.

The rubber composition preferably contains a vulcanization accelerator. Content of the vulcanization accelerator is, for example, more than 0.3 parts by mass and less than 10.0 parts by mass with respect to 100 parts by mass of the rubber component.

Examples of the vulcanization accelerator include
thiazole-based vulcanization accelerators such as 2-mercaptobenzothiazole, di-2-benzothiazolyl disulfide, and N-cyclohexyl-2-benzothiadylsulfenamide;
thiuram-based vulcanization accelerators such as tetramethylthiuram disulfide (TMTD), tetrabenzyltiuram disulfide (TBzTD), and tetrakis (2-ethylhexyl) thiuram disulfide (TOT-N);
sulfenamide-based vulcanization accelerators such as N-cyclohexyl-2-benzothiazolesulfenamide, N-t-butyl-2-benzothiazolyl sulfenamide, N-oxyethylene-2-benzothiazolesulfenamide, and N,N'-diisopropyl-2-benzothiazolesulfenamide; and
guanidine-based vulcanization accelerators such as diphenylguanidine, di-ortho-tolylguanidine and ortho-tolylbiguanidine. These may be used alone or in combination of two or more.

(b-9) Others

In addition to the above components, the rubber composition may contain additives commonly used in the tire industry, such as fatty acid metal salts, carboxylic acid metal salts, organic peroxides, anti-reversion agents may be further contained, if desired. Content of these additives is, for example, more than 0.1 parts by mass and less than 200 parts by mass with respect to 100 parts by mass of the rubber component.

(2) Production of Rubber Composition

The rubber composition forming the cap rubber layer is prepared by appropriately adjusting the various compounding materials described above and performing a general method, for example, a manufacturing method having a base kneading step of kneading a rubber component and a filler such as carbon black, and a finish kneading step of kneading the kneaded product obtained in the base kneading step and a cross-linking agent.

Kneading can be performed using a known (closed) kneader such as a Banbury mixer, kneader, open roll, or the like.

The kneading temperature in the base kneading step is, for example, higher than 50° C. and lower than 200° C., and the kneading time is, for example, more than 30 seconds and less than 30 minutes. In the base kneading step, in addition to the above components, compounding agents conventionally used in the rubber industry, such as softeners such as oils, zinc oxide, anti-aging agents, waxes, and vulcanization accelerators, may be appropriately added and kneaded as desired.

In the finish kneading step, the kneaded material obtained in the base kneading step and a cross-linking agent are kneaded. The kneading temperature in the finish kneading step is, for example, higher than room temperature and lower than 80° C., and the kneading time is, for example, more than 1 minute and less than 15 minutes. In the finish kneading step, in addition to the above components, a vulcanization accelerator, zinc oxide, and the like may be appropriately added and kneaded as desired.

2. Manufacture of Tires

The tire according to the present invention can be produced as an unvulcanized tire by forming a tread rubber having a predetermined shape using the rubber composition obtained above as a cap rubber layer, and then forming the tire together with other tire members by an ordinary method on a tire molding machine.

When the tread portion is to have a multi-layered structure with the base rubber layer, a rubber composition forming a base rubber layer can be obtained, basically, by using the above-described rubber component and compounding materials, appropriately changing the compounding amount, and kneading in the same manner. Then, it is extruded together with the cap rubber layer and molded into a tread rubber of a predetermined shape, and then molded together with other tire members on a tire molding machine by a normal method to produce an unvulcanized tire.

Specifically, on the molding drum, the inner liner as a member to ensure the airtightness of the tire, the carcass as a member to withstand the load, impact, and filling air pressure received by the tire, a belt member as a member to strongly tighten the carcass to increase the rigidity of the tread, and the like are wound, both ends of the carcass are fixed to both side edges, a bead portion as a member for fixing the tire to the rim is arranged, and formed into a toroid shape. Then the tread is pasted on the center of the outer circumference, and the sidewall is pasted on the radial outer side to form the side portion. Thus, an unvulcanized tire is produced.

Then, the produced unvulcanized tire is heated and pressed in a vulcanizer to obtain a tire. The vulcanization step can be carried out by applying a known vulcanization means. The vulcanization temperature is, for example, higher than 120° C. and lower than 200° C., and the vulcanization time is, for example, more than 5 minutes or and less than 15 minutes.

The tire thus obtained can obtain driving force by pressing down the snow on the road surface, taking it into the grooves of the tread portion as snow pillars, and then discharging the snow pillars from the grooves as the tire rotates. Therefore, it is possible to improve the propulsion performance on the snow-covered road surface.

The tire according to the present invention is not particularly limited in category, and can be used as a tire for passenger cars, a tire for heavy-duty vehicles such as trucks and buses, a tire for motorcycles, a run-flat tire, a non-pneumatic tire, and the like, but it is preferable to use a tire for a passenger car. Moreover, it is preferable to set it as a pneumatic tire.

EXAMPLE

Examples considered to be preferable when implementing the present invention are shown below, but the scope of the present invention is not limited to these examples. In the examples, a pneumatic tire (tire size: LT275/70R18, aspect ratio: 70%, land ratio: 63%) made from a composition obtained by using various chemicals mentioned below and changing the formulation according to each Table were evaluated. The results calculated based on the following evaluation methods are shown in Tables 2 to 4.

1. Rubber Composition Forming Cap Rubber Layer
(1) Compounding Material
(a) Rubber Component
   (a-1) SBR-1: Modified S-SBR obtained by the method shown in the next paragraph (Styrene content: 25% by mass, vinyl content: 25% by mass)
   (a-2) SBR-2: HPR840 (S-SBR) manufactured by ENEOS Materials Co., Ltd. (Styrene content: 10% by mass, vinyl content: 42% by mass)
   (a-3) NR: TSR20
   (a-4) BR: Ubepol BR150B (Hi-cis BR) manufactured by Ube Industries, Ltd. (cis content 97% by mass, trans content 2% by mass, vinyl content 1% by mass)

(Manufacture of SBR-1)

The above SBR-1 is produced according to the following procedure. First, two autoclaves having an internal volume of 10 L, having an inlet at the bottom and an outlet at the top, equipped with a stirrer and a jacket, were connected in series as reactors. Butadiene, styrene, and cyclohexane were each mixed in a predetermined ratio. This mixed solution is passed through a dehydration column filled with activated alumina, mixed with n-butyllithium in a static mixer to remove impurities. Then, it is continuously supplied from the bottom of the first reactor, further 2,2-bis(2-oxolanyl) propane as a polar substance and n-butyllithium as a polymerization initiator are continuously supplied at a predetermined rate from the bottom of the first reactor, and the internal temperature of the reactor is kept at 95° C. The polymer solution is continuously withdrawn from the top of the first reactor and supplied to the second reactor. The temperature of the second reactor is kept at 95° C., and a mixture of tetraglycidyl-1,3-bisaminomethylcyclohexane (monomer) as a modifier and an oligomer component is continuously added, as a 1000-fold dilution of cyclohexane, at a predetermined rate to carry out the denaturation reaction. This polymer solution is continuously withdrawn from the reactor, an antioxidant is added continuously by a static mixer, and the solvent is removed to obtain the desired modified diene polymer (SBR-1).

The vinyl content (unit: mass %) of the SBR-1 is determined by infrared spectroscopy from the absorption intensity near 910 cm$^{-1}$, which is the absorption peak of the vinyl group. Also, the styrene content (unit: % by mass) is determined from the refractive index according to JIS K6383:1995.

(b) Compounding Materials Other than Rubber Components
   (b-1) Carbon black: Show Black N134 manufactured by Cabot Japan Co., Ltd. (CTAB specific surface area: 135 m$^2$/g)
   (b-2) Silica: Ultrasil VN3 manufactured by Evonik Industries Co., Ltd. (N$_2$SA: 175 m$^2$/g, 18 nm)
   (b-3) Silane coupling agent: Si266 manufactured by Evonik Industries (bis(3-triethoxysilylpropyl) disulfide)
   (b-4) Resin: Petrotac 90 (C5/C9 copolymer petroleum resin) manufactured by Tosoh Corporation
   (b-5) Oil: Diana Process AH-24 (aroma oil) manufactured by Idemitsu Kosan Co., Ltd.
   (b-6) Wax: Sannok N manufactured by Ouchi Shinko Chemical Industry Co., Ltd.

(b-7) Anti-aging agent-1: Antigen 6C manufactured by Sumitomo Chemical Co., Ltd. (N-(1,3-dimethylbutyl)-N'-phenyl-p-phenylenediamine)

(b-8) Anti-aging agent-2: Antigen RD manufactured by Sumitomo Chemical Co., Ltd. (Polymer of 2,2,4-trimethyl-1,2-dihydroquinoline)

(b-9) Stearic acid: bead stearic acid "Tsubaki" manufactured by NOF Corporation (b-10) Zinc oxide: Two types of zinc oxide manufactured by Mitsui Mining & Smelting Co., Ltd.

(b-11) Processing aid: EF44 (saturated fatty acid zinc salt) manufactured by Structol Co., Ltd.

(b-12) Sulfur: powdered sulfur (containing 5% oil) manufactured by Tsurumi Chemical Industry Co., Ltd.

(b-13) Vulcanization accelerator: Nocceler CZ manufactured by Ouchi Shinko Chemical Industry Co., Ltd. (N-cyclohexyl-2-benzothiazylsulfenamide (CBS))

(2) Rubber Composition Forming Cap Rubber Layer

Using a Banbury mixer, materials other than sulfur and a vulcanization accelerator are kneaded at 150° C. for 5 minutes according to the formulations shown in Tables 2 to 4 to obtain a kneaded product. Note that, each compounding amount is a mass part.

Next, sulfur and a vulcanization accelerator are added to the kneaded product, and kneaded at 80° C. for 5 minutes using an open roll to obtain a rubber composition forming a cap rubber layer.

2. Rubber Composition Forming Base Rubber Layer

In parallel, a rubber composition for forming the base rubber layer is obtained based on the formulation shown in Table 1 in the same manner as the rubber composition for forming the cap rubber layer.

TABLE 1

| Compounding material | Compounding amount (part by mass) |
|---|---|
| NR (TSR20) | 70 |
| BR (UBEPOL-BR150B manufactured by Ube Industries, Ltd.) | 30 |
| Carbon black (Show Black N330T manufactured by Cabot Japan Co., Ltd.) | 35 |
| Stearic acid ("Tsubaki" stearic acid manufactured by NOF Corporation) | 2 |
| Zinc oxide (Zinc white No.1 manufactured by Mitsui Mining & Smelting Co., Ltd.) | 4 |
| Wax (Sannok wax manufactured by Ouchi Shinko Chemical Co., Ltd.) | 2 |
| Antiaging agent (Nocrac 6C manufactured by Ouchi Shinko Chemical Industry Co., Ltd) | 3 |
| Antiaging agent (Antage RD manufactured by Kawaguchi Chemical Industry Co., Ltd.) | 1 |
| Sulfur (powder sulfur manufactured by Tsurumi Chemical Industry Co., Ltd.) | 1.7 |
| Vulcanization accelerator (Nocceler CZ-G manufactured by Ouchi Shinko Chemical Industry Co., Ltd.) | 1.2 |

3. Cap Rubber and Pneumatic Tire

Each rubber composition is extruded into a predetermined shape with a total thickness of 17.5 mm so that (thickness of cap rubber layer/thickness of base rubber layer)=90/10, and a tread portion is produced.

After that, it is pasted together with other tire members to form an unvulcanized tire, and press-vulcanized for 10 minutes at 170° C. to produce each pneumatic tire (test tire) of Examples 1 to 17 and Comparative Examples 1 to 5.

4. Calculation of Parameters

The following parameters are then determined for each test tire.

(1) Tan δ

From the cap rubber layer of the tread portion of each test tire, a rubber test piece for viscoelasticity measurement is prepared by cutting a size of 20 mm in length×4 mm in width×2 mm in thickness so that the tire circumferential direction is the long side. For each rubber test piece, tan δ is measured using Eplexor series manufactured by GABO under the conditions of frequency of 10 Hz, initial strain of 5%, dynamic strain of 1%, and deformation mode: tensile at a temperature of 0° C., 10° C., and 30° C. to obtain 0° C. tan δ, 10° C. tan δ and 30° C. tan δ. The 30° C. tan δ of the base rubber layer is 0.07.

(2) Tg

Regarding each measurement sample prepared by cutting out from the cap rubber layer of the tread portion of each test tire with a size of 20 mm in length×4 mm in width×1 mm in thickness, so that the tire circumferential direction was the long side, tan δ is measured using "Eplexor (registered trademark)" series manufactured by GABO under the conditions of frequency of 10 Hz, initial strain of 2%, amplitude of ±1%, and a heating rate of 2° C./min, with changing the temperature from −80° C. to 40° C., and the temperature corresponding to the largest tan δ value in the obtained temperature distribution curve is determined as Tg (° C.).

(3) AE

Using a vulcanized rubber test piece prepared by cutting out from the cap rubber layer of the tread portion of each test tire, AE (% by mass) is determined according to JIS K 6229:2015.

(4) Groove Depth

Each test tire is placed in a standardized state, and the height from the groove bottom to the opening of the groove is measured under no load, and the maximum value is determined as the groove depth G (mm).

After that, using the obtained groove depth G (mm), [−0.5×G−35] and [−0.5×G−42] are calculated. Also, [10° C. tan δ/G (mm)] is calculated from 10° C. tan δ and the groove depth G (mm).

(5) Other Parameters

Then, the amount of silica/the amount of carbon black (silica/CB) in each test tire is obtained. (SBR content×land ratio) and (silica content×aspect ratio) are calculated based on the specifications and compounding contents of each test tire.

5. Performance Evaluation (Propulsion Performance on Snow-Covered Road Surface)

Each test tire is installed on all wheels of a test vehicle (displacement 2400 cc, four-wheel drive vehicle), filled with air to the standardized internal pressure, and then run on a snow-covered road surface. Each of the 20 drivers sensorily evaluated the propulsion performance in 5 stages (the higher the number, the better). Then, the total points of the evaluations by the 20 drivers are calculated.

Next, with the result in Comparative Example 2 set to 100, the measured result is indexed based on the following formula to evaluate propulsion performance on a snow-covered road surface. A larger value indicates better propulsion performance on a snow-covered road surface.

Propulsion performance on a snow-covered road surface=[(Result of test tire)/(Result of Comparative Example 2)]×100

TABLE 2

| | EXAMPLE | | | | | | | |
|---|---|---|---|---|---|---|---|---|
| | 1 | 2 | 3 | 4 | 5 | 6 | 7 | 8 |
| Formulation of cap rubber layer | | | | | | | | |
| SBR-1 | 40 | 60 | 60 | 60 | 60 | — | 60 | 60 |
| SBR-2 | — | — | — | — | — | 60 | — | — |
| NR | 20 | — | — | — | — | — | — | — |
| BR | 40 | 40 | 40 | 40 | 40 | 40 | 40 | 40 |
| Carbon black (CB) | 25 | 25 | 50 | 25 | 25 | 25 | 50 | 30 |
| Silica | 75 | 75 | 40 | 75 | 75 | 75 | 40 | 55 |
| Coupling agent | 6 | 6 | 3.2 | 6 | 6 | 6 | 3.2 | 4.4 |
| Resin | 7 | 7 | 7 | 3 | 7 | 10 | — | — |
| Oil | 33 | 33 | 25 | 36 | 33 | 33 | 33 | 27 |
| Wax | 2 | 2 | 2 | 2 | 2 | 2 | 2 | 2 |
| Anti-aging agent-1 | 2 | 2 | 2 | 2 | 2 | 2 | 2 | 2 |
| Anti-aging agent-2 | 1 | 1 | 1 | 1 | 1 | 1 | 1 | 1 |
| Stearic acid | 2 | 2 | 2 | 2 | 2 | 2 | 2 | 2 |
| Zinc oxide | 2 | 2 | 2 | 2 | 2 | 2 | 2 | 2 |
| Processing aid | 2 | 2 | 2 | 2 | 2 | 2 | 2 | 2 |
| Sulfur | 1.4 | 1.4 | 1.4 | 1.4 | 1.4 | 1.4 | 1.4 | 1.4 |
| Vulcanization accelerator | 2 | 2 | 2 | 2 | 2 | 2 | 2 | 2 |
| Parameter | | | | | | | | |
| AE (% by mass) | 15.5 | 15.5 | 13.5 | 15.2 | 15.5 | 16.5 | 13.8 | 11.8 |
| Filler amount (part by mass) | 100 | 100 | 90 | 100 | 100 | 100 | 90 | 85 |
| Groove depth G (mm) | 14 | 14 | 14 | 14 | 10 | 10 | 14 | 14 |
| $-0.5 \times G - 35$ | −42 | −42 | −42 | −42 | −40 | −40 | −42 | −42 |
| $-0.5 \times G - 42$ | −49 | −49 | −49 | −49 | −47 | −47 | −49 | −49 |
| Tg (° C.) | −42 | −47 | −47 | −48 | −47 | −48 | −48 | −48 |
| 10° C. tan δ | 0.27 | 0.27 | 0.27 | 0.26 | 0.27 | 0.27 | 0.24 | 0.23 |
| 0° C. tan δ | 0.32 | 0.31 | 0.31 | 0.28 | 0.31 | 0.29 | 0.27 | 0.26 |
| 30° C. tan δ | 0.27 | 0.26 | 0.26 | 0.25 | 0.26 | 0.25 | 0.23 | 0.21 |
| 10° C. tan δ/G (mm) | 0.0193 | 0.0193 | 0.0193 | 0.0186 | 0.0270 | 0.0270 | 0.0171 | 0.0164 |
| Silica amount/CB amount | 3 | 3 | 0.8 | 3 | 3 | 3 | 0.8 | 1.8 |
| SBR amount × land ratio (%) | 2520 | 3780 | 3780 | 3780 | 3780 | 3780 | 3780 | 3780 |
| Amount of silica × aspect ratio (%) | 5250 | 5250 | 2800 | 5250 | 5250 | 5250 | 2800 | 3850 |
| Performance evaluation | | | | | | | | |
| Propulsion performance on snowy roads | 102 | 106 | 113 | 115 | 109 | 114 | 124 | 127 |

TABLE 3

| | EXAMPLE | | | | | | |
|---|---|---|---|---|---|---|---|
| | 9 | 10 | 11 | 12 | 13 | 14 | 15 |
| Formulation of cap rubber layer | | | | | | | |
| SBR-1 | — | 60 | 60 | 60 | 60 | 60 | 80 |
| SBR-2 | 60 | — | — | — | — | — | — |
| NR | — | — | — | — | — | — | — |
| BR | 40 | 40 | 40 | 40 | 40 | 40 | 20 |
| Carbon black (CB) | 30 | 50 | 50 | 30 | 50 | 50 | 25 |
| Silica | 55 | 40 | 40 | 55 | 30 | 30 | 75 |
| Coupling agent | 4.4 | 3.2 | 3.2 | 4.4 | 2.4 | 2.4 | 6 |
| Resin | 2 | 7 | — | — | — | — | 7 |
| Oil | 27 | 25 | 33 | 27 | 25 | 25 | 33 |
| Wax | 2 | 2 | 2 | 2 | 2 | 2 | 2 |
| Antiaging agent-1 | 2 | 2 | 2 | 2 | 2 | 2 | 2 |
| Anti-aging agent-2 | 1 | 1 | 1 | 1 | 1 | 1 | 1 |
| Stearic acid | 2 | 2 | 2 | 2 | 2 | 2 | 2 |
| Zinc oxide | 2 | 2 | 2 | 2 | 2 | 2 | 2 |
| Processing aid | 2 | 2 | 2 | 2 | 2 | 2 | 2 |
| Sulfur | 1.4 | 1.4 | 1.4 | 1.4 | 1.4 | 1.4 | 1.4 |
| Vulcanization accelerator | 2 | 2 | 2 | 2 | 2 | 2 | 2 |

TABLE 3-continued

| | EXAMPLE | | | | | | |
|---|---|---|---|---|---|---|---|
| | 9 | 10 | 11 | 12 | 13 | 14 | 15 |
| Parameter | | | | | | | |
| AE (% by mass) | 12.4 | 13.5 | 13.8 | 11.8 | 11.4 | 11.4 | 15.5 |
| Filler amount (part by mass) | 85 | 90 | 90 | 85 | 80 | 80 | 100 |
| Groove depth G (mm) | 14 | 9 | 12 | 12 | 14 | 12 | 10 |
| −0.5 × G − 35 | −42 | −40 | −41 | −41 | −42 | −41 | −40 |
| −0.5 × G − 42 | −49 | −47 | −48 | −48 | −49 | −48 | −47 |
| Tg (° C.) | −50 | −47 | −48 | −48 | −48 | −48 | −40 |
| 10° C. tan δ | 0.23 | 0.27 | 0.24 | 0.23 | 0.23 | 0.23 | 0.27 |
| 0° C. tan δ | 0.24 | 0.31 | 0.27 | 0.26 | 0.27 | 0.27 | 0.33 |
| 30° C. tan δ | 0.20 | 0.26 | 0.23 | 0.21 | 0.21 | 0.21 | 0.24 |
| 10° C. tan δ/G (mm) | 0.0164 | 0.0300 | 0.0200 | 0.0192 | 0.0164 | 0.0192 | 0.0270 |
| Silica amount/CB amount | 1.8 | 0.8 | 0.8 | 1.8 | 0.6 | 0.6 | 3 |
| SBR amount × land ratio (%) | 3780 | 3780 | 3780 | 3780 | 3780 | 3780 | 5040 |
| Amount of silica × aspect ratio (%) | 3850 | 2800 | 2800 | 3850 | 2100 | 2100 | 5250 |
| Performance evaluation | | | | | | | |
| Propulsion performance on snowy roads | 135 | 120 | 135 | 138 | 139 | 144 | 104 |

TABLE 4

| | EXAMPLE | | COMPARATIVE EXAMPLE | | | | |
|---|---|---|---|---|---|---|---|
| | 16 | 17 | 1 | 2 | 3 | 4 | 5 |
| Formulation of cap rubber layer | | | | | | | |
| SBR-1 | 60 | 60 | 30 | 40 | 60 | 60 | 60 |
| SBR-2 | — | — | — | — | — | — | — |
| NR | — | — | 30 | 20 | — | 40 | — |
| BR | 40 | 40 | 40 | 40 | 40 | — | 40 |
| Carbon black (CB) | 25 | 25 | 25 | 25 | 25 | 30 | 25 |
| Silica | 35 | 55 | 75 | 30 | 75 | 40 | 50 |
| Coupling agent | 2.8 | 6 | 6 | 2.4 | 6 | 3.2 | 6 |
| Resin | 15 | 7 | — | 12 | 17 | 7 | 20 |
| Oil | 10 | 18 | 33 | — | 23 | 18 | 5 |
| Wax | 2 | 2 | 2 | 2 | 2 | 2 | 2 |
| Anti-aging agent-1 | 2 | 2 | 2 | 2 | 2 | 2 | 2 |
| Anti-aging agent-2 | 1 | 1 | 1 | 1 | 1 | 1 | 1 |
| Stearic acid | 2 | 2 | 2 | 2 | 2 | 2 | 2 |
| Zinc oxide | 2 | 2 | 2 | 2 | 2 | 2 | 2 |
| Processing aid | 2 | 2 | 2 | 2 | 2 | 2 | 2 |
| Sulfur | 1.4 | 1.4 | 1.4 | 1.4 | 1.4 | 1.4 | 1.4 |
| Vulcanization accelerator | 2 | 2 | 2 | 2 | 2 | 2 | 2 |
| Parameter | | | | | | | |
| AE (% by mass) | 15.5 | 15.5 | 13.1 | 6.6 | 15.5 | 11.9 | 11.4 |
| Filler amount (part by mass) | 100 | 100 | 100 | 55 | 100 | 70 | 75 |
| Groove depth G (mm) | 10 | 10 | 10 | 10 | 10 | 5 | 14 |
| −0.5 × G − 35 | −40 | −40 | 40 | −40 | −40 | −38 | −42 |
| −0.5 × G − 42 | −47 | −47 | −47 | −47 | −47 | −45 | −49 |
| Tg (° C.) | −42 | −47 | −43 | −42 | −41 | −38 | −40 |
| tan δ at 10° C. | 0.21 | 0.24 | 0.27 | 0.22 | 0.32 | 0.27 | 0.27 |
| 0° C. tan δ | 0.33 | 0.29 | 0.31 | 0.31 | 0.37 | 0.39 | 0.37 |
| 30° C. tan δ | 0.18 | 0.21 | 0.25 | 0.18 | 0.29 | 0.23 | 0.23 |
| 10° C. tan δ/G (mm) | 0.021 | 0.024 | 0.0270 | 0.0220 | 0.0320 | 0.0540 | 0.0193 |
| Silica amount/CB amount | 1.4 | 2.2 | 3 | 1.2 | 3 | 1.3 | 2 |
| SBR amount × land ratio (%) | 3120 | 3120 | 1890 | 2520 | 3780 | 3780 | 3780 |
| Amount of silica × aspect ratio (%) | 2450 | 3850 | 5250 | 2100 | 5250 | 2800 | 3500 |

TABLE 4-continued

| | EXAMPLE | | COMPARATIVE EXAMPLE | | | | |
|---|---|---|---|---|---|---|---|
| | 16 | 17 | 1 | 2 | 3 | 4 | 5 |
| Performance evaluation | | | | | | | |
| Propulsion performance on snowy roads | 105 | 113 | 96 | 100 | 88 | 82 | 98 |

Although the present invention has been described above based on the embodiments, the present invention is not limited to the above embodiments. Various modifications can be made to the above embodiment within the same and equivalent scope of the present invention.

The present invention (1) is
a tire with a tread portion having a groove, wherein
the cap rubber layer forming the tread portion contains 40 parts by mass or more and 80 parts by mass or less of styrene-butadiene rubber (SBR) having a styrene content of 25% by mass or less in 100 parts by mass of its rubber component, and 60 parts by mass or more of a filler with respect to 100 parts by mass of the rubber component, and is formed from a rubber composition having a loss tangent 10° C. tan δ measured under the conditions of temperature of 10° C., frequency of 10 Hz, initial strain of 5%, and dynamic strain rate of 1% and in deformation mode; tensile of less than 0.28, and a glass transition temperature Tg (° C.) of −40° C. or lower; and
the glass transition temperature Tg (° C.) and the depth G (mm) of the groove satisfy the following (formula 1).

$$Tg \leq -0.5 \times G - 35 \qquad \text{(formula 1)}$$

The present invention (2) is
the tire according to the present invention (1), wherein the styrene-butadiene rubber (SBR) has a styrene content of 20% by mass or less.
The present invention (3) is
the tire according to the present invention (2), wherein the styrene-butadiene rubber (SBR) has a styrene content of 15% by mass or less.
The present invention (4) is
the tire of any combination of the present inventions (1) to (3), wherein content of the filler is 80 parts by mass or more with respect to 100 parts by mass of the rubber component.
The present invention (5) is
the tire of any combination of the present inventions (1) to (4), wherein the 10° C. tan δ is 0.25 or less.
The present invention (6) is
the tire of any combination of the present inventions (1) to (5), wherein the loss tangent 0° C. tan δ of the cap rubber layer measured under the conditions of temperature of 0° C., frequency of 10 Hz, initial strain of 5%, and dynamic strain rate of 1%, and in deformation mode: tensile, is 0.30 or less.
The present invention (7) is
the tire of any combination of the present inventions (1) to (6), wherein the 0° C. tan δ is 0.28 or less.
The present invention (8) is
the tire of any combination of the present inventions (1) to (7), wherein the loss tangent 30° C. tan δ of the cap rubber layer measured under the conditions of temperature of 30° C., frequency of 10 Hz, initial strain of 5%, and dynamic strain rate of 1%, and in deformation mode: tensile, is 0.26 or less.
The present invention (9) is
the tire of any combination of the present inventions (1) to (8), wherein the following (formula 2) is satisfied.

$$Tg \leq -0.5 \times G - 42 \qquad \text{(Formula 2)}$$

The present invention (10) is
the tire of any combination of the present inventions (1) to (9), wherein the ratio of the 10° C. tan δ to the groove depth G (mm) (10° C. tan δ/G) is 0.025 or less.
The present invention (11) is
the tire of any combination of the present inventions (1) to (10), wherein the thickness of the cap rubber layer is 10% or more of the entire tread portion.
The present invention (12) is
the tire of any combination of the present inventions (1) to (11), wherein the land ratio in the tread portion is 40% or more, and the product of the content (parts by mass) of the styrene-butadiene rubber (SBR) having a styrene content of 25% by mass or less in 100 parts by mass of the rubber component and the land ratio (%) in the tread portion (SBR content×land ratio) is 6700 or less.
The present invention (13) is
the tire of any combination of the present inventions (1) to (12), wherein the aspect ratio is 80% or less, the cap layer contains silica, and the product of the silica content (parts by mass) with respect to 100 parts by mass of the rubber component and the aspect ratio (silica content×aspect ratio) is 9000 or less.

What is claimed is:
1. A tire with a tread portion having a groove, wherein
a cap rubber layer forming the tread portion contains
40 parts by mass or more and 80 parts by mass or less of styrene-butadiene rubber (SBR) having a styrene content of 25% by mass or less in 100 parts by mass of its rubber component, and 60 parts by mass or more of a filler with respect to 100 parts by mass of the rubber component, and
is formed from a rubber composition having
a loss tangent 10° C. tan δ of 0.11 or more and 0.24 or less, which is measured under the conditions of temperature of 10° C., frequency of 10 Hz, initial strain of 5%, and dynamic strain rate of 1% and in deformation mode: tensile,
a loss tangent 0° C. tan δ of 0.26 or less, and
a glass transition temperature Tg (° C.) of −40° C. or lower;
the glass transition temperature Tg (° C.) and a depth G (mm) of the groove satisfy the following (formula 1)

$$Tg \leq -0.5 \times G - 35 \qquad \text{(formula 1); and}$$

the filler includes silica and carbon black, and the (silica content)/(content of carbon black) ratio is 1.8 or less; and a ratio 10° C. tan δ/G is 0.012/mm or more and 0.020/mm or less.

2. A tire with a tread portion having a groove, wherein a cap rubber layer forming the tread portion contains 40 parts by mass or more and 80 parts by mass or less of styrene-butadiene rubber (SBR) having a styrene content of 25% by mass or less in 100 parts by mass of its rubber component, and 60 parts by mass or more of a filler with respect to 100 parts by mass of the rubber component, and is formed from a rubber composition having a loss tangent 10° C. tan δ of 0.11 or more and 0.24 or less, which is measured under the conditions of temperature of 10° C., frequency of 10 Hz, initial strain of 5%, and dynamic strain rate of 1% and in deformation mode: tensile, a loss tangent 0° C. tan δ of 0.27 or less, and a glass transition temperature Tg (° C.) of −48° C. or lower;

the glass transition temperature Tg (° C.) and a depth G (mm) of the groove satisfy the following (formula 1)

$$Tg \leq -0.5 \times G - 35 \quad \text{(formula 1); and}$$

the acetone extractable content (AE) of the cap rubber layer is 13.8% by mass or less; and a ratio 10° C. tan δ/G is 0.012/mm or more and 0.020/mm or less.

3. A tire with a tread portion having a groove, wherein a cap rubber layer forming the tread portion contains 40 parts by mass or more and 80 parts by mass or less of styrene-butadiene rubber (SBR) having a styrene content of 25% by mass or less in 100 parts by mass of its rubber component, and 60 parts by mass or more of a filler with respect to 100 parts by mass of the rubber component, and is formed from a rubber composition having a loss tangent 10° C. tan δ of 0.11 or more and 0.24 or less, which is measured under the conditions of temperature of 10° C., frequency of 10 Hz, initial strain of 5%, and dynamic strain rate of 1% and in deformation mode: tensile, a loss tangent 0° C. tan δ of 0.27 or less, and a glass transition temperature Tg (° C.) of −40° C. or lower; and the glass transition temperature Tg (° C.) and a depth G (mm) of the groove satisfy the following (formula 1)

$$Tg \leq -0.5 \times G - 35 \quad \text{(formula 1)};$$

the acetone extractable content (AE) of the cap rubber layer is 13.8% by mass or less;

the filler includes silica and carbon black, and the (silica content)/(content of carbon black) ratio is 1.8 or less; and a ratio 10° C. tan δ/G is 0.012/mm or more and 0.020/mm or less.

4. The tire according to claim 3, wherein content of the filler is 80 parts by mass or more with respect to 100 parts by mass of the rubber component.

5. The tire according to claim 3, wherein the loss tangent 30° C. tan δ of the cap rubber layer is 0.26 or less, which is measured under the conditions of temperature of 30° C., frequency of 10 Hz, initial strain of 5%, and dynamic strain rate of 1%, and in deformation mode: tensile.

6. The tire according to claim 3, wherein the following (formula 2) is satisfied $$Tg \leq -0.5 \times G - 42 \quad \text{(Formula 2)}.$$

7. The tire according to claim 3, wherein the ratio of the 10° C. tan δ to the groove depth G (mm) (10° C. tan δ/G) is 0.025 or less.

8. The tire according to claim 3, wherein the thickness of the cap rubber layer is 10% or more of the entire tread portion.

9. The tire according to claim 3, wherein the land ratio in the tread portion is 40% or more, and the product of the content (parts by mass) of the styrene-butadiene rubber (SBR) having a styrene content of 25% by mass or less in 100 parts by mass of the rubber component and the land ratio (%) in the tread portion (SBR content×land ratio) is 6700 or less.

10. The tire according to claim 3, wherein the aspect ratio is 80% or less, the cap layer contains silica, and the product of the silica content (parts by mass) with respect to 100 parts by mass of the rubber component and the aspect ratio (silica content×aspect ratio) is 9000 or less.

11. The tire according to claim 3, wherein the styrene-butadiene rubber (SBR) has a styrene content of 20% by mass or less.

12. The tire according to claim 11, wherein the styrene-butadiene rubber (SBR) has a styrene content of 15% by mass or less.

* * * * *